Dec. 14, 1965  F. J. MILLER  3,223,371

BRACKET FOR SUPPORTING RAILS

Filed Oct. 31, 1963

INVENTOR.
FRED J. MILLER

BY J. E. Trabucco

ATTORNEY

United States Patent Office 3,223,371
Patented Dec. 14, 1965

3,223,371
BRACKET FOR SUPPORTING RAILS
Fred J. Miller, 520 Bryant St., San Francisco, Calif.
Filed Oct. 31, 1963, Ser. No. 320,423
2 Claims. (Cl. 248—251)

This invention relates to a device for supporting hand rails or the like from the sides of concrete walls and other structures.

Devices now employed in supporting hand rails, rods, pipes and the like at the sides of concrete walls usually embody attaching means such as screws or bolts which are adapted to be loosened or even removed through the use of screw drivers, wrenches or other tools by pranksters and others who are intent upon causing damage.

The present invention has for its primary object the provision of a novel hand rail supporting bracket adapted to be easily affixed to the side of a wall in a position wherein a rail, pipe or other member may be supported in a horizontal or inclined position, and which when once installed is tamper-proof to the extent that normally it cannot be loosened or detached from such wall through the use of ordinary tools.

Other and futher objects of this invention will be indicated in the appended claims or will be obvious to one skilled in the art upon an understanding of the present disclosure. For the purpose of this application, I have elected to show herein certain forms and details of a rail supporting bracket which is representative of my invention; it is to be understood, however, that the embodiment of my invention herein shown and described is for purposes of illustration only and that therefore it is not to be regarded as exhaustive of the variations of the invention in the art.

Figure 1:
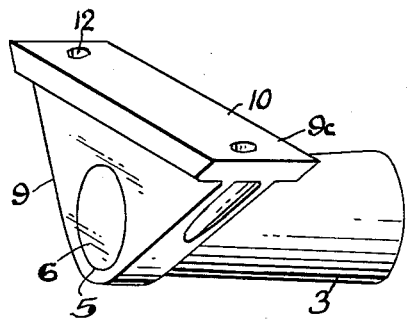
FIG. 1 is a perspective view of a supporting bracket embodying my invention.
Figure 2:
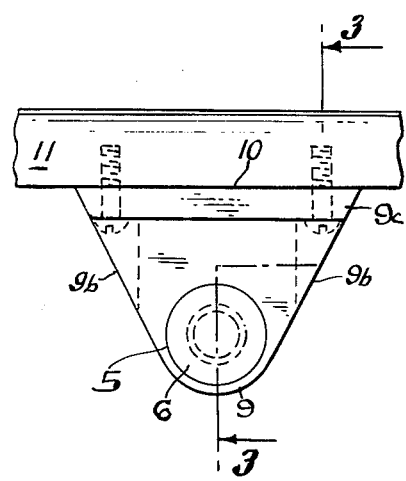
FIG. 2 is an end view of the bracket, showing a rail mounted thereon.
Figure 3:
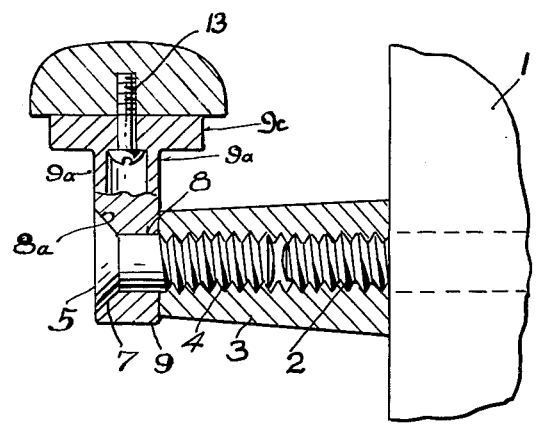
FIG. 3 is a sectional view taken on the line 3—3 of FIG. 2.
Figure 4:
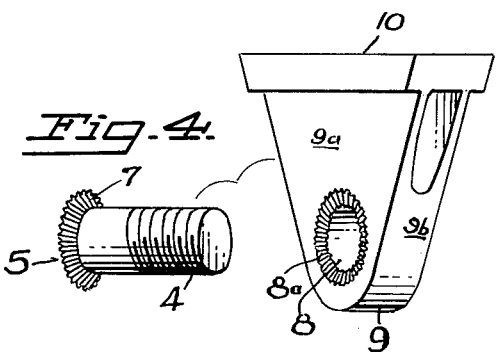
FIG. 4 is a composite perspective view of the bracket showing the parts thereof in detached positions.

Referring to the drawing, the numeral 1 shows a concrete wall or other structure upon the side of which a rail, pipe or other element is to be supported by means of several aligned brackets of the type embodying my invention. Secured to and projecting perpendicularly from the wall is a threaded stud 2 which extends into the inner end of an internally threaded sleeve or tubular member 3. The sleeve is rotatively adjustable on the stud so that the inner end of such sleeve may firmly abut the side of the wall when the sleeve is suitably rotated and adjusted inwardly.

Screwed into the outer end of the sleeve 3 is an adjustable screw 4 having a head 5 provided with a plane or smooth outer surface as at 6. The sides of the head are tapered and converge inwardly as at 7, and preferably such sides are formed circumferentially with inwardly converging serrations. The screw 4 extends loosely through an opening 8 in a rail supporting member or body 9 of suitable size and shape having a side 10 engaging with the rail 11 or other element to be mounted on such member. The sides of the opening 8 at the outer end of the latter, converging inwardly, provide a tapered socket 8a within which the head 5 of the screw 4 is adapted to fit snugly. The sides of the socket 8a are also preferably formed with inwardly converging serrations. The size of the screw head 5 is such that when the screw 4 has been adjusted inwardly to carry the rail supporting member 9 into firmly abutting relationship with the outer end of the sleeve 3, the outer face 6 of the screw head will preferably be flush with the outer side of the said member, or will be positioned slightly within the opening. When so positioned, the head 5 of the screw cannot be engaged by a wrench or other tool to turn the screw to loosen or detach it from the sleeve.

The rail supporting member 9 may embody various shapes, but in the particular embodiment illustrated, such member comprises a somewhat V-shaped body having parallel flat sides 9a, 9a, downwardly converging sides 9b, 9b and a flanged upper portion 9c having the flat upper side 10 for engagement with the rail. In the event a length of pipe or other device is to be supported instead of a rail, the flanged upper portion 9c of the member 9 may embody a shape best suited for the attachment of the supported device.

The member 9 is provided with suitable openings 12 adapted to receive screws 13 for the attachment of the rail.

In assembling the bracket, the sleeve 3 is first rotatively adjusted on the stud 2 until its inner or larger end (if the sleeve is tapered) is in abutting relationship with the outer face of the wall 1. The screw 4 is then passed through the opening 8 in the member 9, following which the said screw is screwed into the opening to position the said member close to the outer end of the sleeve. In order to position the member 9 finally so the flanged portion 9c thereof is in a suitable position for mounting the rail or other element thereon, the said member is suitably adjusted on the screw and held in such preliminarily adjusted position as the said screw, by means of the inward pressure of a finger thereon, is rotated sufficiently to bring the member into firm engagement with the outer end of the sleeve and at the same time turn the said member sufficiently to position it finally for the attachment of the rail or other element. When the screw 4 has been finally adjusted to a position wherein its head 5 is lodged in the socket 8a, the outer face 6 of such screw will be flush with the outer side 9a of the member 9, and the said member will be held securely against the outer end of the sleeve. When the rail has been secured to two (2) or more of the aligned brackets, the members 9 thereof cannot be turned to loosen the screws 4, nor can such screws be turned by a wrench or screw driver, since the heads 5 of such screws are lodged wholly within the sockets 7. It is to be noted that the member 9 may also be arranged to support the rail or the like in a suspended or inclined position.

What I claim is:

1. In a bracket for supporting a hand rail or the like on the side of a supporting structure, an internally threaded sleeve adapted to be mounted on a device extending outwardly from the supporting structure, a body having means for mounting a rail or the like thereon and having an opening extending therethrough in registry with the opening in the sleeve, the outer end portion of the opening in the body having converging sides forming an inwardly tapered socket, the said converging sides having inwardly converging serrations thereon, and a screw extending loosely through the opening in the body and having an inwardly tapered head adapted to fit wholly within the socket, the said tapered head having converging serrations thereon adapted to engage with the serrations on the sides of the socket, the screw head having an outer planar face, the screw extending into and engaging with the threads in the outer portion of the sleeve and arranged for inward adjustment to lodge the head wholly within the socket and adjust the body toward and into abutting relationship with the outer end of the sleeve.

2. In a bracket for supporting a hand rail or the like on the side of a supporting structure, an internally threaded sleeve adapted to be mounted on a device extending outwardly from the supporting structure, a body having means for mounting a rail or the like thereon and having an opening extending therethrough in registry with the opening in the sleeve, the outer end portion of the opening in the body having inwardly converging sides forming an inwardly tapered socket, and a screw extending loosely through the opening in the body and having an inwardly tapered head adapted to fit inside the socket, such screw head having a smooth outer face, the screw extending into the outer portion of the sleeve and engaging with the threads thereof and arranged for inward adjustment to lodge the head in the socket and adjust the body toward and into abutting relationship with the outer end of the sleeve, the tapered sides of the socket and the screw head having inwardly converging serrations.

References Cited by the Examiner

UNITED STATES PATENTS

| | | | |
|---|---|---|---|
| 1,345,338 | 7/1920 | Baker | 248—241 |
| 2,292,239 | 8/1942 | Pierce et al. | 151—37 |
| 2,512,209 | 6/1950 | Marchand | 248—225 |
| 2,905,446 | 9/1959 | Blum | 256—65 |
| 3,018,077 | 1/1962 | Buehler | 248—251 X |
| 3,076,636 | 2/1963 | Blum | 256—65 X |

CLAUDE A. LE ROY, *Primary Examiner.*

FRANK L. ABBOTT, *Examiner.*